UNITED STATES PATENT OFFICE.

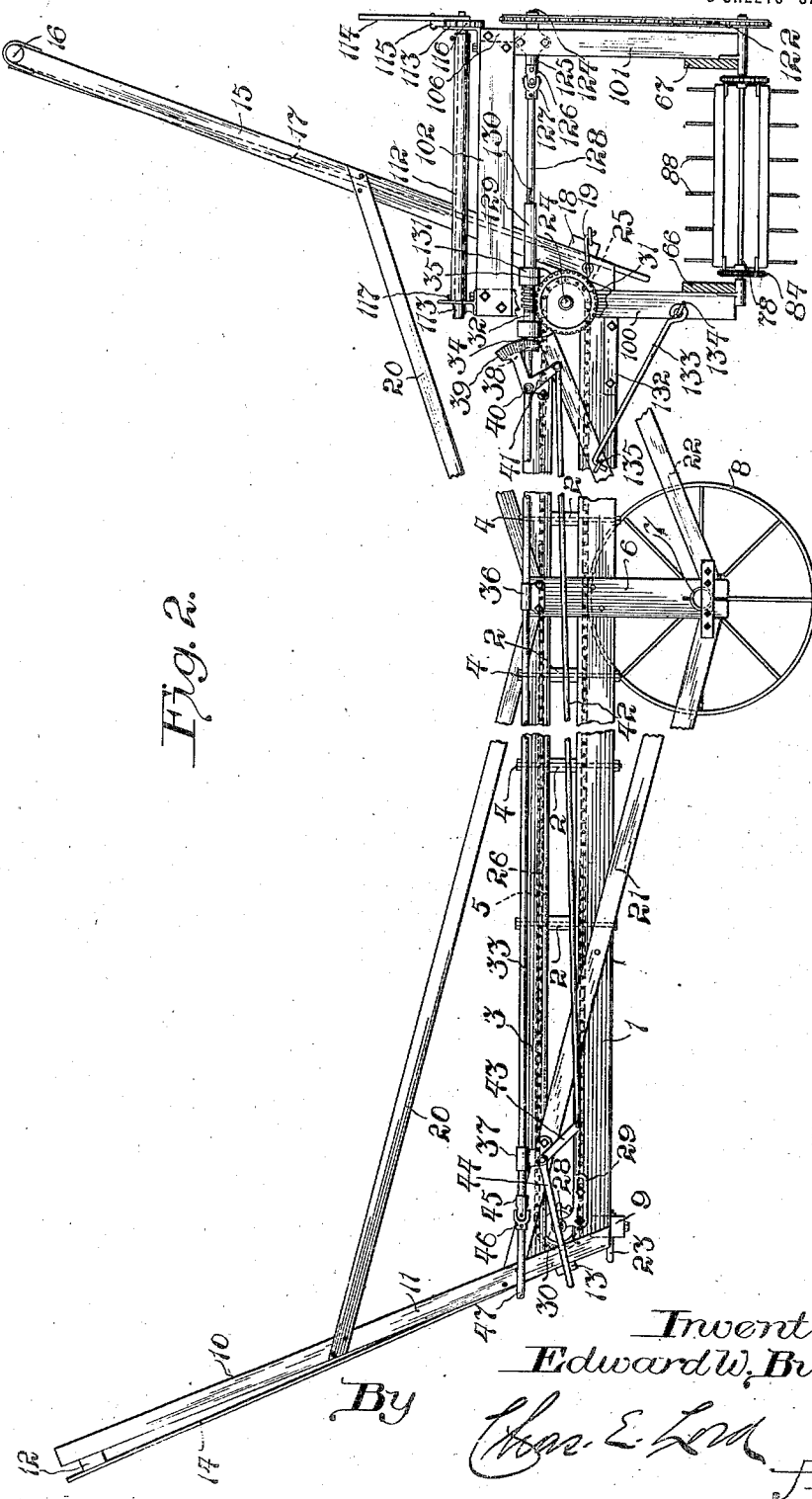

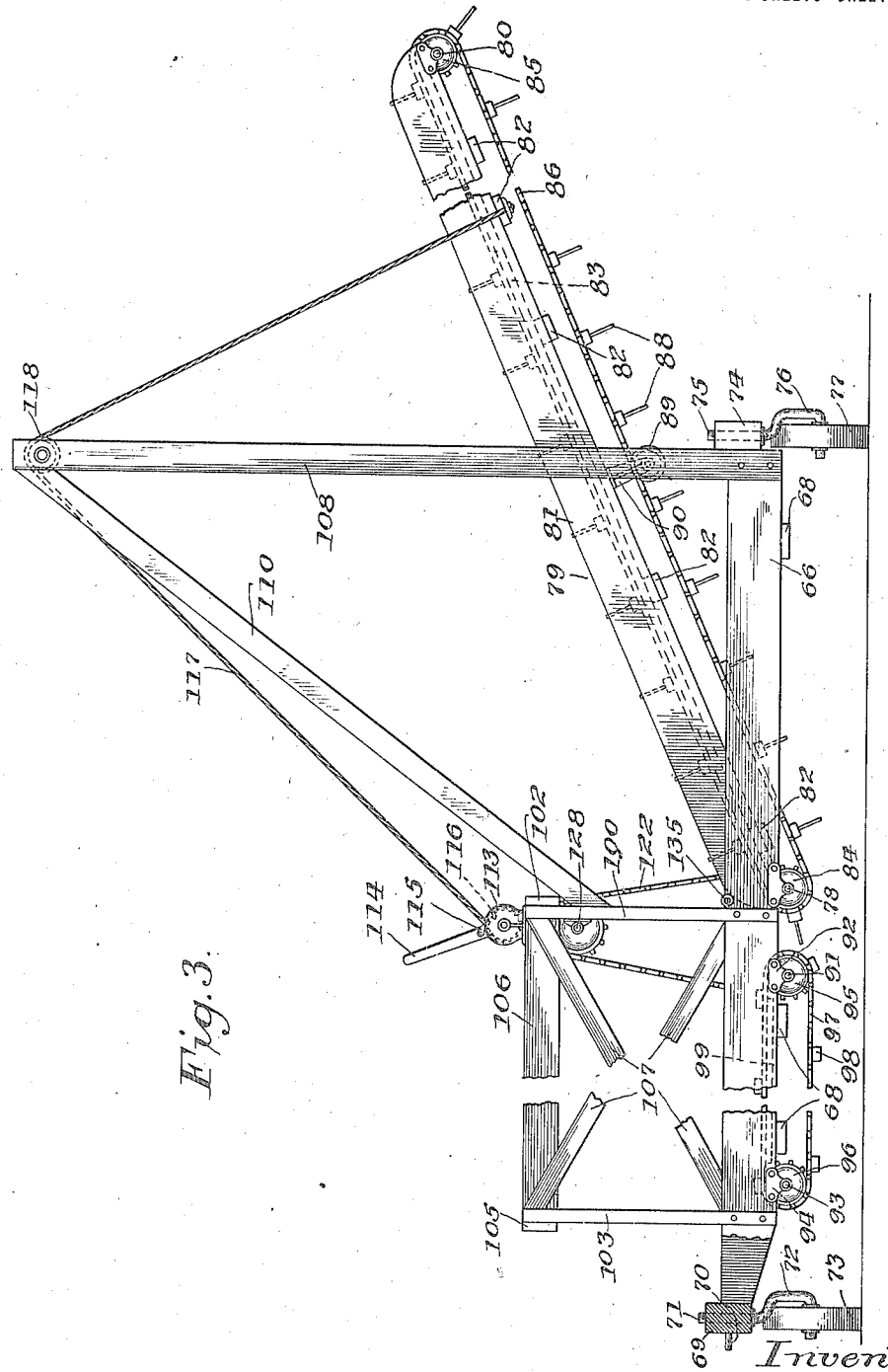

EDWARD W. BURGESS, OF CHICAGO, ILLINOIS, ASSIGNOR, BY MESNE ASSIGNMENTS, TO INTERNATIONAL HARVESTER COMPANY, A CORPORATION OF NEW JERSEY.

GRAIN-HARVESTING MACHINERY.

1,312,304.	Specification of Letters Patent.	Patented Aug. 5, 1919.

Application filed December 9, 1915. Serial No. 66,003.

*To all whom it may concern:*

Be it known that I, EDWARD W. BURGESS, a citizen of the United States, residing at Chicago, in the county of Cook and State of Illinois, have invented certain new and useful Improvements in Grain-Harvesting Machinery, of which the following is a full, clear, and exact specificatiton.

My invention relates to grain harvesting machinery, and comprises a receiving rack mounted upon truck wheels and provided with an endless carrier operative longitudinally upon its floor, and means whereby it may be connected with a tractor in trailing relation and have the endless apron operatively connected with the power transmission gearing of the tractor in a manner whereby a load may be carried rearward and delivered by the rack to a transversely disposed carrier adapted to elevate it to the mow or stack, the operation of the mechanism being controlled by the operator.

The object of the invention is to improve and simplify harvesting equipment.

This object is accomplished by providing a construction of rack and portable stacker that may be readily coupled together and have their operative parts driven from a common source of power for the purpose indicated.

This invention is illustrated on the accompanying sheets of drawings, in which—

Fig. 2 is a side elevation of the truck and rack with parts broken away, and a sectional end elevation of part of the stacker attachment; and Fig. 3 is a front elevation of the stacker, partly in section, with parts broken away.

The same reference numerals designate like parts throughout the several views.

Figure 1:
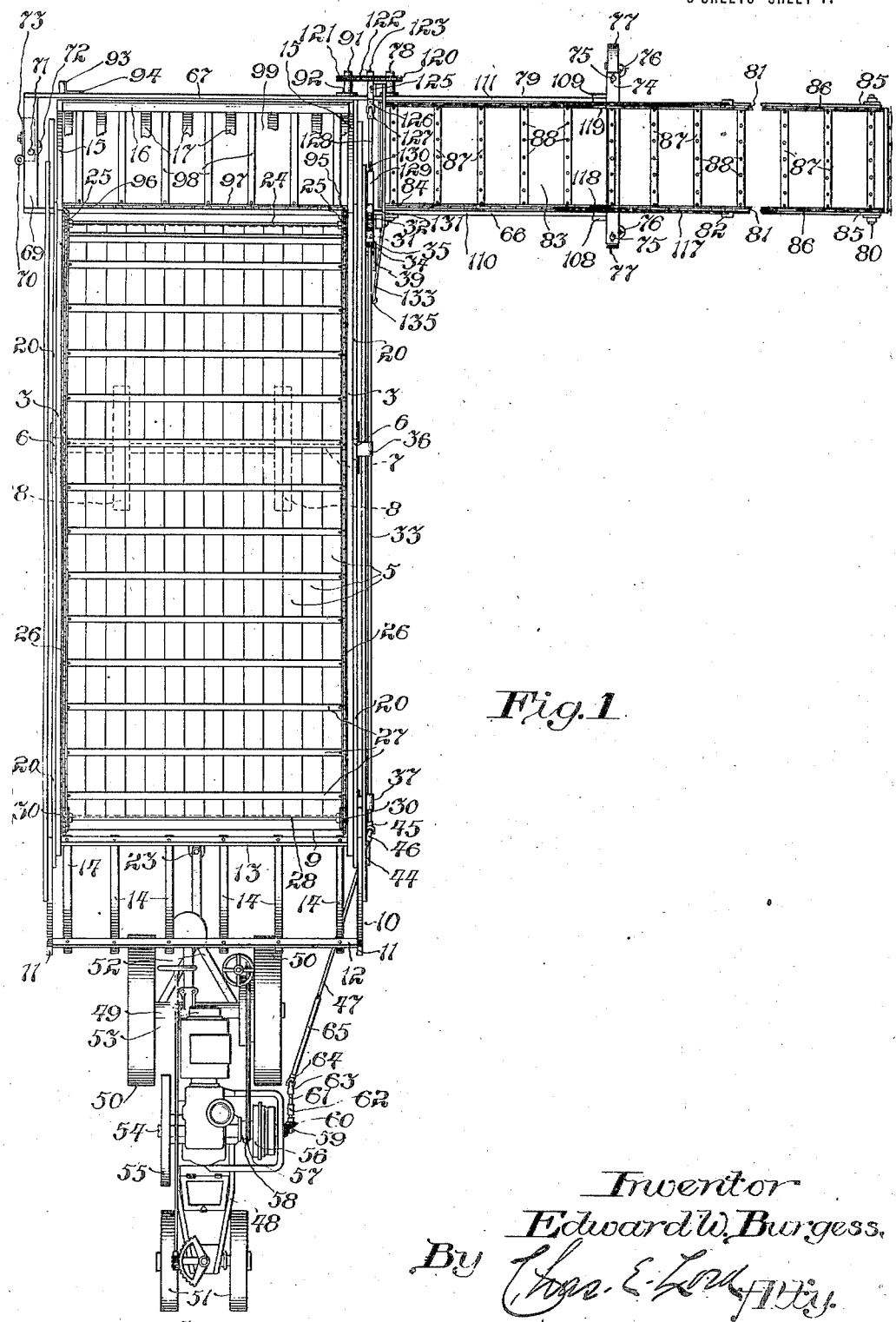
Figure 1 is a top plan view of a tractor, a trailing truck, a rack, and a stacker coupled together and embodying my invention.

The rack includes longitudinally disposed bed frame members 1 upon its opposite sides, a series of transverse frame members 2 spaced apart along the length of the bed members, 3 longitudinally disposed side frame members secured to the ends of the transverse members by means of bolts 4 passing through the members 1, 5 floor boards secured to the upper sides of the transverse frame members between the side frame members 3 and forming the bottom of the rack, 6 vertically disposed truck frame members having their upper ends secured to the frame members 1 and 3 upon opposite sides of the rack and their lower ends provided with openings that receive opposite ends of a fixed tubular axle 7 having truck wheels 8 journaled thereon between the bed frame members 1, 9 a transversely disposed draft bar secured to the front ends of the frame members 1, 10 a forwardly inclined frame at the front of the rack including side members 11 having their lower ends secured to the front ends of the bed frame members 1 and 3, a transverse bar 12 connecting their upper ends, 13 a transverse bar secured to their lower ends, and 14 a series of slats spaced apart, having their upper ends secured to the bar 12 and their opposite ends to the bar 13. 15 represents rearwardly inclined frame members having their lower ends secured to the rear ends of the bed frame members 1 and 3, 16 a transverse bar having its opposite ends journaled in the upper ends of the members 15, 17 a series of slats spaced apart, having their upper ends secured to the bar 16 and their lower ends to a transverse bar 18, forming a swinging end-gate to the rack that is secured in a load receiving position by means of releasable hooks 19 connecting it with the lower ends of the inclined frame members 15, 20 longitudinally disposed tie members connecting the middle parts of the frame members 11 and 15 with the two frame members 3 upon opposite sides of the rack bed, 21 and 22 inclined truss members connecting the front and rear ends, respectively, of the bed frame members 1 and 3 with the lower ends of the vertically disposed truck frame members 6, and 23 a draft eye secured to the middle part of the draft bar 9. 24 represents a transverse shaft journaled in bearings carried by the rear end of the bed frame, and having sprocket wheels 25 secured to its opposite ends that receive endless carrier chains 26 connected by means of cross slats 27 adapted to move along the bottom of the rack, the front end of the endless carrier being operatively connected with a transverse shaft 28 journaled in bearings 29 adjustable upon the front end of the bed frame of the rack and carrying sprocket wheels 30 that receive the chains 26. 31 represents a worm wheel secured to one end of the shaft 24 and engaging with a worm 32 secured to the rear end of a longitudinally disposed shaft 33 journaled in an eccentric bearing sleeve 34 rotatably mounted in a bearing box 35 secured to the bed frame members. 36 represents a bearing box secured to the upper end of the truck frame member 6 and loosely receiving the middle of the shaft 33, and its front end is journaled in a bearing box 37 secured to the front end of the truss member 21. The eccentric bearing sleeve 34 is provided at its front end with gear teeth 38 that mesh with a sector rack 39 pivoted upon a stud 40 carried by the bed frame member 3 and provided with a depending arm 41, to which is pivotally connected the rear end of a rod 42, having its front end pivotally connected with an arm 43 of a lever 44 pivotally mounted upon the front end of the frame member 21 whereby the operator may control the rotation of the bearing sleeve 34 in a manner to throw the worm 32 in or out of engagement with the worm wheel 31 at will. 45 represents a universal coupling member secured to the front of the shaft 33 and operatively connected with the corresponding coupling member 46 secured to the rear end of a shaft 47.

As shown in Fig. 1, the rack and truck are adapted to be drawn by a tractor, preferably like that shown in my application for patent filed September 22, 1915, and having Serial No. 52,098, including a truck frame 48 having its rear end carried by an axle supporting member 49 and traction wheels 50, and its front end by steering wheels 51 and draft frame 52, whereby the tractor is connected with the draft eye 23, an engine cylinder 53, power shaft 54, fly wheel 55, and a power transmission gear mechanism 56 including a sprocket chain 57, a transversely disposed countershaft 58 having a bevel pinion 59 secured to its outside end that meshes with a corresponding pinion 60 secured to the front end of a longitudinally disposed shaft 61 journaled in a bearing 62 turnable about the axis of the countershaft, and 63 represents a universal coupling member secured to the rear end of the shaft 61 and operatively connected with a corresponding coupling member 64 secured to the front end of a sleeve 65 that is splined to the front end of the shaft 47 forming part of the driving mechanism of the endless carrier of the rack.

The rack is adapted to be used in connection with a tractor operated shock loader like that shown and described in my application for patent filed November 13, 1915, Serial No. 61,404, and when loaded is drawn to the barn or stack and coupled to a portable elevator and carrier, as shown in Figs. 1 and 2 of the drawings, that include horizontally disposed front and rear bed frame members 66 and 67, respectively, that are connected by a series of transverse bars 68 intermediate their ends and upon their lower sides. 69 represents a draft bar secured to one end of the bed frame members, having a draft eye 70 secured to its middle and the stem 71 of a caster wheel supporting arm 72, having a caster wheel 73 journaled upon its lower end, is journaled in the draft bar. 74 represents a transverse bar secured to the ends of the bed frame members and having a vertical stem 75 and caster wheel supporting arm 76, upon the lower end of which are journaled caster wheels 77 journaled in opposite ends of the bar. 78 represents a transversely disposed shaft journaled in bearings secured to the bed frame members 66 and 67 near their middle, and 79 an elevator trunk having its lower end adapted to turn about the axis of the shaft in a vertical plane, and 80 a transversely disposed shaft journaled in bearings carried by the opposite ends of the side frame members 81 of the trunk. 82 represents transverse frame bars secured to the lower sides of the side frame members 81, and to which is secured a deck 83. The shafts 78 and 80 are provided with sprocket wheels 84 and 85, respectively, that are secured to their opposite ends and carry endless chains 86 that are connected by spaced cross slats 87, each of the slats having a series of teeth 88, and 89 represents carrying wheels journaled upon bracket members 90 secured to the side frame members 81 of the trunk supporting the lower lead of the endless slatted carrier. 91 represents a transverse shaft disposed parallel with and adjacent the shaft 78 journaled in bearing brackets 92 secured to the horizontally disposed bed frame members 66 and 67, and 93 a similar shaft journaled in bearing brackets 94 secured to the bed frame members near the draft bar 69. The shafts 91 and 93 carry sprocket wheels 95 and 96, respectively, that are secured to their opposite ends and over which run endless chains 97 connected by cross slats 98, and 99 represents a deck secured to the transverse bars 68, over which the endless carrier operates. 100 and 101 represent vertically disposed frame members having their lower ends secured to the bed frame members 66 and 67, respectively, adjacent the receiving end of the elevator trunk 79, and 102 a transversely disposed frame member secured to their upper ends. 103 and 104 represent like vertically disposed frame members having their lower ends secured to the bed frame members 66 and 67, respectively, adjacent the draft bar 69, and 105 a transversely disposed frame member secured to their opposite ends. The upper ends of the frame members 101 and 104 are connected by means of a longitudinally disposed frame member 106, and 107 represents a pair of diagonally disposed brace members connecting their opposite ends. 108 and 109 represent vertically disposed mast members having their lower ends secured to the bed frame members 66 and 67, respectively, and their upper ends connected with the vertical frame members 100 and 101 by means of brace members 110 and 111, respectively. Means are provided for raising or lowering the delivery end of the elevator trunk 79 including a transversely disposed winding roller 112 journaled in bearing members 113 carried by the upper ends of the vertical frame members 100 and 101 and provided with a crank 114 at its rear end that carries a pawl 115 adapted to engage with a fixed ratchet toothed member 116. Hoisting ropes 117 are connected with opposite ends of the winding roller and are led over sheaves 118 and 119 journaled upon the upper ends of the mast members 108 and 109, respectively, and then outward and downward and secured to opposite ends of one of the transverse frame bars 82 of the elevator trunk.

Means are provided for transmitting power to the operative parts of the elevator including sprocket wheels 120 and 121 secured to the rear ends of the shafts 78 and 91, respectively, a sprocket chain 122 connecting the two sprocket wheels with a third sprocket wheel 123 secured to the rear end of a transversely disposed shaft 124 journaled in a bearing member 125 secured to the upper end of the vertical frame member 101, and 126 a universal coupling member secured to the front end of the shaft and operatively connected with a corresponding coupling member 127 secured to the rear end of a shaft 128, having its front end slidably connected with a sleeve member 129 by means of a spline 130, the front end of the sleeve being provided with a slip coupling head 131 adapted to be operatively connected with the worm 32.

Secured to the rear ends of the bed frame members 1 of the rack are bumper blocks 132 that engage with the vertical frame members 100 and 103 of the elevator when the rack is moved into position, and 133 represents connecting hooks having their rear ends flexibly connected with the frame members 100 and 103 by means of eye members 134, and their opposite ends adapted to be received by eye members 135 secured to the bed frame members 1 of the rack.

In operation, the loaded rack is coupled with the elevator by means of the hooks 133, the shaft 128 is moved to a position permitting the coupling head 131 to be connected with the worm 32, the hooks 19 are then disengaged from the end-gate of the rack and permitted to be swung rearward about its axis to the rear side of the horizontal carrier that receives grain as it falls from the rear end of the rack and delivers it to the receiving end of the elevator that conveys it to the mow or stack, the delivery end of the elevator being adjusted vertically when required. The elevator carriers are driven continuously by means of their operative connections with the shaft 33 that derives motion from the power transmission gearing of the tractor, and the endless carrier operating upon the rack intermittently or continuously, at the will of the operator, who controls the engagement of the worm 32 with the worm wheel 31 by means of the lever 44 in a manner to deliver the load from the rack within the capacity of the elevator to convey it to the mow or stack. When the grain is being stacked the tractor coupled with the rack may move the elevator forward or backward along the length of the same in a manner to deliver the grain along its longitudinal center convenient for a man upon the stack to arrange it properly. To transport the elevator to a different position for operation, the draw bar of the tractor may be connected with the draft eye 70 in the draft bar 69.

Having shown and described one embodiment of my invention, I do not desire that it be confined closely to the specific details of the structure as illustrated, it being understood that many changes may be made in the form and organization of its various parts without departing from its spirit as indicated in the appended claims.

What I claim as my invention, and desire to secure by Letters Patent, is:

1. A power propelled vehicle, an elevating equipment including, in combination, a receptacle having a movable bottom for discharging material therefrom, elevating mechanism carried by said receptacle and extending substantially at right angles to the receptacle for receiving the discharged material and elevating the same, and means whereby said movable bottom and elevating mechanism may be actuated simultaneously or the elevating mechanism alone from the source of power when the equipment is being propelled or when it is stationary.

2. In combination, a combined grain rack and truck including an endless carrier operative longitudinally rearward along its floor, a longitudinally disposed shaft journaled upon the frame of said rack, a tractor including a power transmission gear mechanism, means for connecting said tractor with said truck, said shaft being operatively connected with said power transmission mechanism at one end and at its opposite end with said endless carrier, and elevating mechanism carried at the rear of said rack and extending laterally therefrom operatively connected to said power transmission gear mechanism.

3. In combination, a combined grain rack and truck including an endless carrier operative longitudinally rearward along its floor, a longitudinally disposed shaft journaled upon the frame of said rack, a tractor including a power transmission gear mechanism, means for connecting said tractor with said truck, said shaft being connected at one end with the power transmission gear mechanism and at its opposite end with the endless carrier, means controllable by the operator for connecting or disconnecting said shaft and said endless carrier mechanism, and elevating mechanism carried at the rear of said rack and extending laterally therefrom and operatively connected to said power transmission gear mechanism.

In testimony whereof I affix my signature.

EDWARD W. BURGESS.